April 17, 1962 J. E. MAGNER ET AL 3,030,175
PREPARATION OF HIGH PURITY $UF_4$
Filed July 31, 1957 2 Sheets-Sheet 1

INVENTORS.
JAMES E. MAGNER
RAY S. LONG
BY DAVID A. ELLIS
ROBERT R. GRINSTEAD
ATTORNEY.

April 17, 1962     J. E. MAGNER ET AL     3,030,175
PREPARATION OF HIGH PURITY UF$_4$
Filed July 31, 1957     2 Sheets-Sheet 2

INVENTORS.
JAMES E. MAGNER
RAY S. LONG
DAVID A. ELLIS
ROBERT R. GRINSTEAD

BY Roland A. Anderson
ATTORNEY.

3,030,175
PREPARATION OF HIGH PURITY UF₄
James E. Magner, Antioch, and Ray S. Long, David A. Ellis, and Robert R. Grinstead, Concord, Calif., assignors, by mesne assignments, to the United States of America as represented by the United States Atomic Energy Commission
Filed July 31, 1957, Ser. No. 675,504
1 Claim. (Cl. 23—14.5)

This invention relates in general to the recovery of uranium from process solutions and, more particularly, to the recovery of uranous uranium by extraction with an alkyl phosphate and precipitation as a purified uranous tetrafluoride.

Uranium is effectively recovered from low grade ores, ore leach solutions, various process solutions, or other uranium containing substances in various processes such as ion exchange, resin-in-pulp, and solvent extraction heretofore developed, wherein uranium is selectively adsorbed from an impure solution by contact with various ion exchange resins, e.g., disposed in an ion exchange column, uranium selectively adsorbed from an ore slurry or pulp by various ion exchange resins disposed in situ in said pulp, and wherein an extractant phase containing various organic phosphate esters in an organic solvent is employed to leach or extract uranium away from undesired materials, respectively. The uranium is obtained in the final stages of the processes supra in the form of an enriched eluate or strip solution wherein the uranium is dissolved in mineral acid or salt solutions having an acidity varying from about neutral to strong acid solutions of 8 to 10 M and even higher.

Now it has been discovered that uranium values are selectively extracted from such eluates and strip solutions with high efficiency, economy and in a state of especially high purity by treatment including reduction of the uranium to the +4 oxidation state, extraction with an extractant phase comprising an alkyl phosphate and a solvent-diluent and the precipitation of the extracted values as exceptionally pure uranous tetrafluoride from said extractant phase. The alkyl phosphate, i.e., the preferred compound tributyl phosphate, hereafter abbreviated as TBP, has been found to be surprisingly selective for uranous uranium and in general to reject most other metal ions occurring in appreciable amounts with the uranium in such reduced eluates and strip solutions. In addition, the reduced uranium extracted into the TBP phase is finally recovered therefrom as exceptionally pure uranous tetrafluoride by simple precipitation directly from said phase by the addition of aqueous hydrofluoric acid solution.

Such highly purified uranous tetrafluoride products are extremely vital and useful within the atomic energy industry since the purity thereof is adequate for conversion into uranium hexafluoride used as feed material in the gaseous diffusion process wherein the uranium is separated into component isotopes to produce uranium enriched in $U_{235}$ and even uranium metal which is employed in nuclear reactors. Due to the detrimental sensitivity of nuclear reactors to even very small amounts of neutron absorbing impurities, feed materials whence the nuclear fuels are derived must, of necessity, be extremely pure to yield nuclear fuels of the purity required in the art.

It is therefore an object of the invention to provide a method for the recovery of uranium in a highly pure state from eluates obtained in ion exchange processes.

Another object of the invention is to provide a method for the recovery of highly purified uranium from eluates obtained in resin-in-pulp processes.

Another object of the invention is to provide a method for the recovery of highly purified uranium from acid stripping solutions obtained in solvent extractant processes.

Another object of the invention is to provide a process for separating uranium from associated metal impurities in acid strip solutions and eluates derived from various uranium ore treatment and other uranium recovery processes.

Still another object of the invention is to provide a process for separating uranium from associated metal impurities by reduction in an acidic solution or eluate thereof and then contacting said solution or eluate with an immiscible extractant phase comprising TBP and an organic solvent-diluent.

A further object of the invention is to provide a process for preparing high purity uranium tetrafluoride by extracting uranous uranium from reduced strip solutions and eluates with an organic phase including TBP and a solvent-diluent and then precipitating uranous fluoride from said organic phase with aqueous hydrofluoric acid.

The invention, both as to its organization and method of operation, together with further objects and advantages thereof, will be understood by reference to the following specification taken in conjunction with the accompanying drawing, of which:

Figure 1:
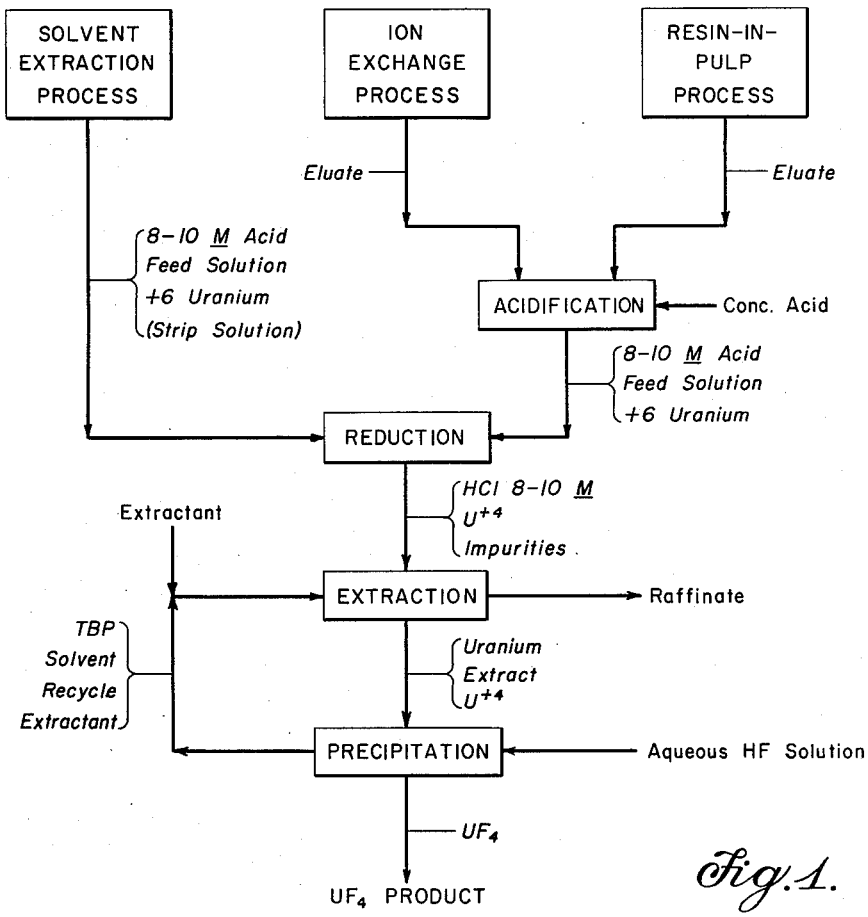
FIGURE 1 is a diagrammatic flow sheet illustrating the process of the invention.

In general, the process of the invention contemplates the recovery of uranium as a highly pure $UF_4$ precipitate or solid from strong acid strip solutions obtained in the final operation in various solvent extraction processes disclosed in the copending application of Robert R. Grinstead, filed June 29, 1956, Serial No. 696,034, now U.S. Patent No. 2,956,074, as well as in certain other copending applications referenced therein. The aforesaid applications include those of: Richard H. Bailes and Ray S. Long, Serial No. 335,276 filed February 5, 1953, now U.S. Patent No. 2,859,092, issued November 4, 1958; Ray S. Long, Serial No. 491,798 filed March 2, 1955, now U.S. Patent No. 2,866,680, issued December 30, 1958; Ray S. Long, Serial No. 502,253 filed April 18, 1955, now U.S. Patent No. 2,882,123, issued April 14, 1959; Robert R. Grinstead, Serial No. 527,428 filed August 9, 1955, now U.S. Patent No. 2,869,979, issued January 20, 1959; and Robert R. Grinstead, Serial No. 527,429 filed August 9, 1955, now U.S. Patent No. 2,869,980, issued January 20, 1959. Similarly, uranium is recoverable by the process of the invention from various uranium containing effluents obtained from ion exchange processes as disclosed in the U.S. patents to R.S. Long, No. 2,770,520 issued November 13, 1956, and in an article by Grinstead, Ellis and Olsen in the Proceedings of the International Conference on the Peaceful Uses of Atomic Energy (Geneva, August 1955), volume 8, pages 49–53. Similarly, uranium is recoverable by the process of the invention from various final uranium containing effluents obtained from resin-in-pulp process as disclosed in an article by Hollis and McArthur in the Proceedings of the International Conference on the Peaceful Uses of Atomic Energy (Geneva, August 1955), volume 8, pages 54–63.

Briefly, in accordance with the invention, whether dealing with stripping solution, ion exchange eluate, resin-in-pulp eluate, or any similar solution, the uranium in said solution is reduced to the +4 oxidation state, the acidity is adjusted to about 8 to 10 M, and the uranium is extracted therefrom with an organic phase comprising alkyl phosphate and an organic solvent-diluent. The uranium in the organic extract phase is then precipitated therefrom as highly purified uranium tetrafluoride by the addition of aqueous hydrofluoric acid solution.

A summary of the prior art processes for producing the feed solution employed in the process of the invention is presented hereinafter. In the solvent extraction processes a solvent extractant phase comprising an organic solvent-diluent and from below 1 to 20-30 or more percent of mono and dialkyl derivatives of phosphoric acid, e.g., alkyl orthophosphoric, alkyl pyrophosphoric and alkyl orthophosphonic acid esters, are employed to leach or extract uranium from mineral acid solutions, solids, or slurried admixtures of solids. The solvent-diluent may be any of a large variety of water immiscible organic fluids such as aromatics, aliphatics, petroleum solvents, etc. The uranium is extracted from various neutral or acidic leach solutions derived by leaching ores or other solids with mineral acids and from aqueous slurries of solids. The extractants may also be used to leach uranium directly from solids such as high lime ores in the presence of concentrated mineral acid. Phase ratios, extractant concentrations, the manner of contacting and other extraction variables are regulated to obtain the optimum degree of recovery, achieve purification, regulate the selectivity of extraction and the like. The uranium is effectively stripped from such extractants by contact, preferably, with hydrochloric acid of at least 8 to 10 molar concentration. The acid strip solution contains the uranium as $UO_2^{++}$ (uranyl) or $U^{+4}$ (uranous) ions together with $Al^{+++}$, $Fe^{+++}$, vanadium and other materials which are extracted at least as effectively as the uranium. $H_2SO_4$ of above about 8 M concentration is used similarly.

In the ion exchange process for the recovery of uranium the ores are leached with either acid or carbonate solutions whereby the uranium is brought into solution for subsequent purification and concentration treatment. In the case of acid leaching, the crushed ore is leached with sulfuric acid whereby the uranium and various other metal values are solubilized and thereby separated from the waste or gangue material. In the carbonate system, the ground ore is leached with about 5 to 10% sodium carbonate solution, usually at an elevated temperature. Such leaching is usually preceded by roasting the ground ore and in some cases the presence of an oxidizing agent is advantageous. In any case the uranium and various other metal values are solubilized and thereby separated from the waste or gangue material. To be efficiently utilized in the ion exchange process the leach solution must be clear and free from suspended solids. Flocculation precipitation and filtration of suspended solids by well-known techniques yields a clarified uranium leach solution for subsequent ion exchange treatment. Such leaching and clarification processes are handled as by percolation leaching or by agitation, thickening and filtration, etc. In any event a clear leach solution is obtained which solution is flowed through columns containing fixed strong base anionic exchange resin beds, wherein the uranium in the form of the anion complex.

in the case of sulfuric acid leach solutions and

in the case of carbonate leach solutions is adsorbed upon the resin and thereby removed from the leach solution. Strongly basic anionic exchange resins of the type comprising quaternary amine substituents on a styrene-divinylbenzene matrix are most suitable for disposition within said exchange columns. Elution of the uranium may be effected with a large number of eluants including solutions of salts and/or acids; however, with the preferred solution being about 1 M in Cl⁻ and about 0.1 M in HCl. Such acidified salt solution is flowed through the resin adsorbate bed whereby the uranium and various metal impurities if present are eluted away from the resin and appear in the eluate solution.

The resin-in-pulp uranium recovery process is utilized most advantageously for the treatment of ores or other uranium containing products wherein a leach solution or slurry is obtained which is not amenable to efficient clarification. In the ion exchange process the leach solution feed to the resin beds in the exchange columns must be free of any suspended solids otherwise the columns soon clog and become inoperable. In the resin-in-pulp process, however, the uranium is efficiently recovered directly from the ore leach pulp by contacting said pulp with gross amounts of suitable ion exchange resins which are disposed in stainless steel screen baskets by immersion therein. The uranium and various metal ion impurities are selectively adsorbed from the leach pulp by strongly basic anion exchange resins of a composition similar to those employed in the ion exchange process, supra, however having physical dimension and properties suitable for the special requirements of resin-in-pulp loading, screening and elution cycles. Subsequent to the absorption cycle the resin and depleted pulp are separated and the uranium is then eluted from the resin with one of a large number of solutions including salts and/or acids, however with the preferred solutions being about 1 M salt, e.g., $NH_4NO_3$ and 0.1 M in acid, e.g., $HNO_3$. In any event a selected eluant and the absorbate are contacted whereby the uranium is eluted from the resin and appears in the effluent eluate solution.

Such uranium containing solvent extraction process strip solutions, ion exchange eluates and resin-in-pulp eluates are most suitable as feed solutions for the operation of the present process. Solvent extraction strip solutions when 8 M or higher in mineral acid are used without further adjustment of the acid content; however, ion exchange and resin-in-pulp eluates, normally weakly acidic, are treated with concentrated acid, preferably hydrochloric, to increase the acid concentration of said eluates to at least 8 to 10 M. $H_2SO_4$ of above about 8 M concentration and other mineral acids are operable but yield less desirable results. While the eluates from ion exchange and resin-in-pulp processes are lower in acidity and therefore require acidification, they are still suitable for treatment in the process of the invention. To obtain the benefits of the invention it is necessary as disclosed elsewhere herein to extract the reduced uranium from a solution having an acid concentration in excess of about 8 M and therefore, such neutral or low acid eluates are treated with concentrated acid prior to the uranium extraction.

Reduction of the metal ions, including uranium and impurities, contained in the solution is also effected prior to the extraction operation and may be carried out either on the low acidity solution or subsequent to acidification as dictated by reduction economics. When the eluate is reduced with an added agent, e.g., aluminum, zinc, etc., it is most economical to reduce the low acidity solution because relatively little metal is wasted in reaction with the acid as would be the case in strong acid solution. However, in the instance where electrolytic reduction is applied it is most advantageous to acidify before reduction whereby increased conductivity of the high acidity solution facilitates the passage of the electrical current and the resulting reduction of the uranium and other ions. In any event concentrated mineral acid, preferably hydrochloric acid, is added to the eluate to bring the acid concentration in said solution to at least 8 M with the uranium values and impurities therein being reduced either before or after the acidity adjustment.

The reductant utilized in the process of the invention is selected for optimum uranium reducing power, non-contaminating characteristics, ease of removal and economy. Most important consideration is given to the ability of the agent to completely reduce the uranium in solution and the formation of products which will not be extracted along with the uranium and appear in the product uranium fluoride as contaminants. Due to the requirement of high product purity the reducing agent must be carefully selected. Certain granular metals, preferably aluminum, are suitable. Such metal is reasonably priced and can be obtained in reagent grade purity. In addition the oxidation product of the metal, $Al^{+++}$ ion, is excluded from the extractant phases of the invention. The reduction efficiency of aluminum on a weight basis is also very advantageous since the metal yields three electrons per atom oxidized. Other metals may also be employed in reducing uranium, e.g., zinc and magnesium; however, in general, considering the reduction efficiency, cost and freedom from contamination, aluminum is the preferred reducing agent.

Moreover, the uranium is reduced with equal efficiency and in some cases in the preferred manner, by electrolysis. Such electrolytic reduction is accomplished by means well known in the art wherein an electric current is passed through the solution with said solution serving as the electrolyte in a compartmented cell. Upon passage of the electrical current the solution in the cathode compartment is reduced. Uranium is most efficiently reduced in such an electrolytic cell especially when present in strong acid strip solutions derived from the aforementioned solvent extraction processes. Similarly, ion exchange and resin-in-pulp eluate are reduced but with less efficiency than solvent extraction strip solutions.

Feed solutions, i.e., solvent extraction strip, ion exchange eluate, and resin-in-pulp eluate in which the acid content is adjusted to at least 8 to 10 M may be more efficiently reduced by electrolysis. Other ion impurities in the feed solutions are similarly reduced along with the uranium. Undesirable ions such as ferric are thereby reduced to the ferrous state in which state such ions are effectively rejected by the TBP extractant phase in the subsequent extraction operation. Typical power requirements for such electrolytic reduction is shown in Example VIII infra. Electrolytic reduction presents the advantage of effectively reducing the uranium in solution without adding any materials to the solution which may be carried through the process and contaminate the desired high purity $UF_4$ product.

With the uranium in the +4 oxidation state and the acid content at least 8 to 10 M, the feed solution is then subjected to the extraction operation. In accordance with the invention the uranous uranium is extracted from such a concentrated mineral acid feed solution by contact with an immiscible extractant phase comprising TBP in admixture with an organic solvent-diluent. In practice such an extractant phase has been found to exhibit an effective extraction efficiency for +4 uranium but to exhibit almost complete extractive selectivity against other metal ions present therein, including at least $Fe^{++}$, $Al^{+++}$, $Mo^{+++}$ and $V^{++}$ ions.

Conventional equipment and methods are used for contacting the reduced acidified feed solution with the TBP extractant phase. Such equipment may be adapted for simple phase equilibrations or countercurrent extraction, e.g., continuous mixer-settler systems, pulsed extraction columns and other systems applicable to the efficient contact and separation of immiscible phases.

Extraction phases containing from about 10 to as high as 70% TBP have been found to be practical for extracting the reduced uranium. With greater concentrations of TBP there occurs an increasing loss of extractant into the acid phase and with lesser concentrations an increasing loss of acid into the extractant phase. It should be noted that solutions of TBP of lower concentration and subsequently lower extraction efficiency can be efficiently utilized in the process of the invention by employing multistage contacting and multistage separation and recycle operations thus effectively employing the lower extraction efficiency of such solutions. In determining extractant concentrations, note that increasing the extractant concentration will compensate for decreased extractivity obtained when the acid concentration is lower, the uranium concentration is lower, with a shorter contact time, with a less effective contact method or less favorable phase ratios. In general, however, it can be stated that TBP concentrations in the range from about 20 to 40% by weight are found to be most satisfactory, since in said concentration range the uranium extraction coefficient is generally adequate and extractant losses into the acid phase are low. Ratios of about 1:1, TBP extractant to feed solution phases are suitable in a single stage operation; however, ratios of less than 1:1 to about 4:1 may be used in multistage operation.

With reference to the tributyl phosphate (TBP) used in the extractant phase of the invention, it should be noted that said phosphate ester is well known in the chemical art and is available from a large number of commercial sources. However, if so desired, tributyl phosphate can be prepared by dissolving phosphorus oxytrichloride in a suitable solvent, e.g., xylene or toluene, and subsequently contacting the solution with a stoichiometric excess of butyl alcohol, whereby tributyl phosphate is formed in admixture with the solvent. Ordinarily n-butyl alcohol is employed; however, isomers and mixtures thereof should behave similarly. The resultant TBP can be isolated from said solvent by distilling the solvent therefrom, or if the solvent is identical with the solvent-diluent used in the uranium extraction, then the tributyl phosphate-solvent reaction solution may be utilized directly in the extraction operation when properly diluted with said solvent-diluent.

Referring now to the solvent-diluent for the TBP extractant phase, it has been determined that solvent-diluent selection is not critical from an extractability standpoint. Furthermore, solvent-diluent loss or decomposition is unimportant in strong acid equilibrations, therefore it can be stated that the organic solvent-diluent selection is determined by simple factors such as TBP solubility therein, cost of the solvent, safety hazards entailed in solvent use, and the manipulatory behavior of the solvent-diluent in a particular extraction system. Solvents which are used in the process of the invention include fluid hydrocarbons, halogenated hydrocarbons, aliphatics, aromatics and others. More specifically solvents such as benzene, ethyl-benzene, chlorobenzene, toluene, xylene, kerosene and other fluid petroleum solvents and carbon tetrachloride have been found to be satisfactory. Based upon generally desirable low volatility and low cost and other factors, toluene is a preferred solvent-diluent.

The uranium transfer velocity from the feed solution phase to the organic phase is very fast with essentially all the uranium being transferred in a few minutes contact time. There is no advantage to be gained in prolonging the contact time beyond a total of about 5 minutes as extended contact yields no increase in the amount of uranium extracted. In fact prolonging the phase contact time slightly increases the loss of solution acid into the TBP phase. Even more important, long contact time exposes the reduced feed solution to the oxidizing action of the air, whereby various of the metal ion impurities may be oxidized into a more extractable state and consequently appear along with the uranium in the organic phase and eventually contaminate the final $UF_4$ product. Therefore, equilibration may be carried out at high speed with the efficient transfer of uranium and a subsequent gain in economy of extraction and purity of the final product.

It is apparent from the above that every precaution should be taken subsequent to reduction of the feed solution to prevent excessive contact with air or other oxidant to prevent the reoxidation of either the uranium or metal impurities. Such reoxidation can be prevented by conducting the reduction and circulation of the feed solution in vessels closed to the atmosphere or by carrying out the successive reduction and extraction operations of the invention in immediate sequence or in an inert atmosphere.

Separation of the phases by conventional methods yields a depleted acidic feed solution which is recycled for further uranium enrichment and an organic extract phase from which the reduced uranium is recovered. The extract will generally contain the uranium as a tetravalent uranium-TBP complex compound. Hexavalent uranium may be present if such existed in the reduced feed solution; however, such hexavalent uranium is recovered by conventional means when the concentration builds up making recovery practical. Thorough reduction of the feed solution and careful operation will keep hexavalent uranium build-up to a minimum. Very small quantities of other metal ions such as $Fe^{++}$ and $Mo^{+++}$, in addition to small proportions of the strong acid may also appear in the extract; however, such materials are effectively separated from the uranium in the subsequent precipitation operation.

Finally, the uranium is precipitated from the organic extract phase as $UF_4$. Due to the peculiar effectiveness of the combination of operations of the process of the invention such $UF_4$ precipitate is obtained in an exceptionally pure state so that it may be used directly or with only minor modification as feed material for various processes for the production of extreme purity uranium metal, feed stock to uranium isotope separation processes and any other application in which the highest purity uranium is required.

Specifically, the uranium laden TBP extractant phase is contacted with a reagent containing a source of available fluoride ions. The tetravalent uranium in the extract phase reacts with said fluoride ions to produce insoluble uranous tetrafluoride salt which precipitates from solution. Since $UF_4$ is essentially completely insoluble, the uranium is quantitatively precipitated from the extract and is recovered therefrom by a simple filtration or centrifuging operation. As stated above, any source of fluoride ion is suitable for use as the $UF_4$ precipitant; however, the preferred precipitant is hydrofluoric acid in aqueous solution. Concentrated or 48% hydrofluoric acid is normally used, although under most circumstances more dilute HF solutions may be likewise employed provided dilution does not increase emulsion tendencies.

While anhydrous HF may also be employed to precipitate the uranium from the extractant, its use is impractical due to the reaction of said reagent with the TBP phase itself and the subsequent destruction of the extractant properties of the TBP. With aqueous HF solutions the extractant phase is virtually unaffected and it can be repeatedly recycled to extract more uranium from other portions of reduced feed solution.

Certain other materials may also be effectively employed as uranium precipitants, these materials being various soluble fluoride salts, e.g., NaF and $NH_4F$. Such fluoride salt solutions when contacted with the extract, precipitate uranium as an insoluble double salt, e.g., $NaUF_5$ or $NH_4UF_5$. For obtaining highly pure uranium fluoride, such double salts are not normally desired since they introduce a second contaminating cation into the precipitate. For feed material purposes such cations are unnecessary and undesirable. However for certain uses such double salts are suitable and therefore such a process is occasionally utilized where extreme purity is not necessary. It should also be noted that a salt such as $NH_4UF_5$ may be easily converted to $UF_4$ by a simple ignition operation wherein the precipitate is heated to eliminate the volatile ammonium ion as ammonia gas and ammonium fluoride leaving the stable tetrafluoride behind.

Aqueous concentrated (48%) hydrofluoric acid, the preferred precipitant of the invention, precipitates uranium from the TBP extractant phase in a most efficient and economic manner yielding a highly pure uranous tetrafluoride. Such aqueous HF solution precipitates 99% of the uranium in the extract when present in about 10% in excess of the stoichiometric quantity and in greater excess a nearly quantitative (99.7%) precipitation of the uranium is obtained. The $UF_4$ precipitate is then filtered or centrifuged from the solution, collected, dried and packaged for use as indicated hereinbefore.

Further details of the process for the preparation of highly pure $UF_4$ precipitate by the extraction of +4 uranium with a TBP extractant phase from solvent extraction strip solution, ion exchange eluates, and resin-in-pulp eluates will become apparent in the following description of specific examples of processes operated in accordance with the invention.

EXAMPLE I

Figure 2:
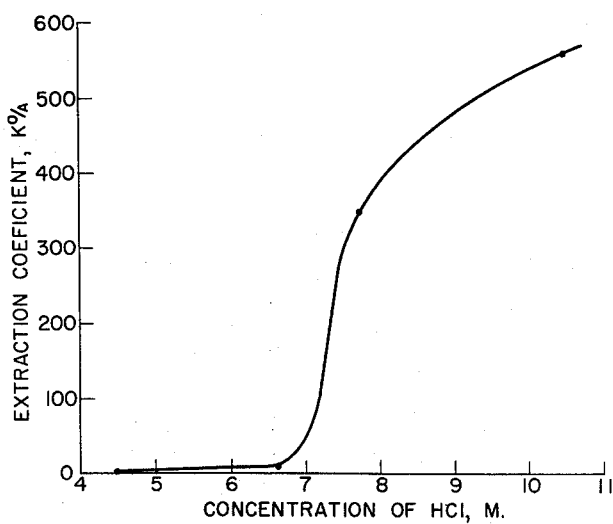
FIGURE 2 is a graphical representation of the uranium extraction coefficient as a function of acid concentration for the extraction of tetravalent uranium by an extractant phase of the invention.

A series of experiments were carried out to determine the distribution of +4 uranium between HCl and an extractant phase having 20% concentration of TBP in toluene as a function of HCl concentration. Uranium in the +6 oxidation state dissolved in 0.5 M HCl was reduced with zinc metal and the HCl concentration of several portions was adjusted in increments to values in the range of 4.6 to 10.5 M prior to extraction. The electromotive potential of the reduced solution as measured between a standard calomel electrode and platinum was about +0.4 volt at each increment level. At the above potential a trace of +3 uranium was initially present but such material was quickly oxidized by air to the +4 state. The individual portions of reduced solution, after adjustment of the acid concentration, were shaken with an equal amount of extractant while under a nitrogen blanket for a period of two minutes. The distribution of the tetravalent uranium between the phases was determined by analysis of phases, and the extraction coefficients calculated with the results graphically illustrated in FIG. 2. As can be seen from FIG. 2, wherein the extraction coefficient (K O/A) is plotted versus acid concentration, the extraction coefficient rose slowly until an acid concentration of about 7 M was reached whereat the coefficient began a rapid rise to a value of 560 at 10.5 M HCl concentration demonstrating the remarkable effectiveness of extraction in accordance with the invention.

EXAMPLE II

In another series of experiments to determine the extractability of uranium in the +4 oxidation state from chloride solutions by a 20% tributyl phosphate in toluene extractant phase, the chloride concentration was adjusted by the addition of $AlCl_3$ to an HCl solution containing the uranium. In some cases the uranium was reduced with zinc to the +4 state before chloride adjustment and in others reduction took place after chloride adjustment. The results of such investigation are tabulated in Table I infra.

Table I

| Initial Conc., $U_3O_8$, gm./l. | Total Cl⁻ M | HCl Conc., M | Phase Ratio, A/O | Final Conc. $U_3O_8$ gm./l. | | Extr. Coeff., K O/A |
|---|---|---|---|---|---|---|
| | | | | Organic | Aqueous | |
| 12.5 | 4.6 | 0.2 | 1.0 | 0.13 | 12.37 | 0.011 |
| 10.0 | 4.7 | 1.0 | 1.0 | 0.08 | 9.9 | 0.008 |
| 10.0 | 5.6 | 1.0 | 1.0 | 0.41 | 9.6 | 0.045 |
| 10.0 | 6.5 | 1.0 | 1.0 | 2.47 | 7.5 | 0.33 |
| 12.5 | 6.7 | 0.2 | 1.0 | 9.35 | 3.03 | 3.0 |
| 10.0 | 7.4 | 1.0 | 1.0 | 8.04 | 1.96 | 4.1 |
| 12.5 | 4.6 | 4.6 | 0.4 | 0.13 | 9.7 | 0.013 |
| 12.5 | 4.6 | 4.6 | 1.0 | 0.13 | 9.9 | 0.013 |
| 12.5 | 6.7 | 6.7 | 1.0 | 9.07 | 0.93 | 9.8 |
| 10.0 | 8.8 | 8.8 | 0.4 | 3.99 | 0.016 | 250 |
| 10.0 | 8.8 | 8.8 | 1.0 | 9.97 | 0.029 | 340 |
| 5.0 | 10.5 | 10.5 | 1.0 | 4.99 | 0.009 | 560 |
| 5.0 | 10.5 | 10.5 | 2.5 | 12.47 | 0.014 | 890 |

It is obvious from the data presented above that the extraction coefficient of +4 uranium into TBP-toluene extractant becomes quite high at chloride concentrations above 8 M and increases at a rapid rate to at least 10.5 M.

EXAMPLE III

The relative extraction efficiency of various metallic impurities most often present with uranium in the solutions amenable to treatment by the present process was ascertained. A solution containing uranium, iron, molybdenum, and vanadium was obtained and reduced with metallic aluminum to a potential of +0.4 volt (see above) and concentrated HCl was added to form a solution 10 M in HCl. Said reduced solution contained 17.0 gm./l. $U_3O_8$ (+4U)
0.4 gm./l. Fe (+2Fe)
0.4 gm./l. $V_2O_5$ (+3V)
0.18 gm./l. Mo (+3Mo)

Aliquots of the above solution were diluted with water to form 7, 8 and 9 M HCl solutions respectively. These samples with adjusted acid concentrations were then equilibrated with 20% TBP in toluene extractant at phase ratios of 1:1 aqueous to organic. A portion of each organic extract was in turn washed with an equal volume of HCl of a concentration equal to that used in the corresponding extraction. The extraction coefficient and scrubbing losses are tabulated in Table II following:

Table II

| HCl Conc., M | Extraction Coefficient, K O/A | | | Scrubbing Loss, Percent | | |
|---|---|---|---|---|---|---|
| | $U_3O_8$ | Fe | Mo | $U_3O_8$ | Fe | Mo |
| 10 | 1,000 | 0.16 | 1.24 | 0.10 | 2 | ca. 10 |
| 9 | 530 | 0.13 | 1.70 | 0.15 | 5 | |
| 8 | 300 | 0.07 | 1.09 | 0.42 | 10 | |
| 7 | 50 | 0.03 | 1.38 | 2.65 | 29 | |

The above data indicate that under the conditions as stated uranium is extracted with increasingly higher efficiency from HCl solutions of increasing concentration, while ferrous iron is also extracted more efficiently but the increase is not as great as that for uranium. The molybdenum extraction coefficient remained essentially constant, and although not indicated by the data, the vanadium extraction was negligible since no vanadium was detected in the extract phases.

EXAMPLE IV

The ability of aluminum to reduce uranium from the +6 oxidation state to the +4 oxidation state in HCl solutions of various concentrations was investigated. The degree of reduction of the uranium in dilute HCl was estimated from the potential of the solution as measured by a saturated calomel electrode versus a platinum electrode. A potential of +0.3 volt was easily attained at which point a trace of uranium in the +3 oxidation state was present. The presence of +3 uranium was indicated by a red color developing in the solution. When the HCl concentration was increased to about 10 M, however, the +3 uranium was immediately oxidized to +4 uranium by short exposure to air without appreciable concurrent oxidation of tetravalent uranium. In strong HCl solutions the above potential reading procedure was of no value since the potential remained strongly negative throughout the course of reduction. Therefore the degree of reduction of the uranium in 10 M HCl with given amounts of granular aluminum was estimated in the following manner. Under the identical conditions (HCl, TBP and U concentrations), the extraction coefficient for +4 uranium is categorically higher than that for +6 uranium. This difference in extractability was utilized to estimate the quantity of each species present in solution after reduction with a known amount of aluminum. The extraction coefficient for each species was determined by averaging the data from several tests conducted under the same conditions. A solution containing 10.0 gram $U_3O_8$/liter and 10 M in HCl was prepared and 25 ml. portions were shaken for 2 minutes with equal volumes of 20% TBP in toluene. An average of the analyses on duplicate runs gave a value of 37.4 for the extraction coefficient (K O/A) for +6 uranium. The +4 uranium solution was prepared by first reducing the uranium and then adjusting the HCl concentration to 10 M. The extraction coefficient for +4 uranium was thereby found to be 770.

Portions of the above solution (10.0 gm. $U_3O_8$/liter as +6 U) were treated with known amounts of aluminum and thereafter a 25 ml. aliquot of each was extracted by shaking for 2 minutes with a 25 ml. portion of 20% TBP in toluene extractant. The resultant depleted aqueous phases were then analyzed for total uranium (+6 and +4) and the corresponding organic concentration was calculated therefrom. Knowing the total quantity of uranium in each phase and the value of K O/A for each oxidation state, the quantity of +4 uranium in each system was calculated and from this the degree of reduction. The results of such reduction process are presented in Table III infra:

Table III

| Al used percent of Stoich. | $U_3O_8$ in aq., gm./l. | $U_3O_8$ in org., gm./l. | K O/A | Reduction of U, percent |
|---|---|---|---|---|
| 0 | 0.26 | 9.74 | 37.4 | 0 |
| 300 | 0.23 | 9.77 | 42.5 | 11 |
| 900 | 0.19 | 9.81 | 51.6 | 28 |
| 1,500 | 0.14 | 9.86 | 70.5 | 48 |
| 260 [1] | 0.013 | 9.99 | 770 | 100 |

[1] Uranium reduced prior to HCl addition to 10 M.

EXAMPLE V

In order to determine the purification of uranium achieved by the reduction step of the invention process, the distribution of one impurity, molybdenum, between HCl solutions and TBP extractant phases was determined. Molybdenum is present in some Colorado Plateau ores and accompanies the uranium through the primary extraction process into the HCl stripping solution. A means of rejecting the molybdenum in the purification process is necessary to insure a high purity $UF_4$ product. Therefore the behavior of molybdenum after various degrees of reduction was investigated during the following extraction tests with TBP extractant solution.

A solution containing molybdenum in the form of molybdate ion and hydrochloric acid was used. Portions of the solution were reduced with known amounts of granular aluminum, adjusted to the desired HCl concentration with concentrated HCl, and then extracted with an equal volume of 20% TBP in toluene with the results tabulated below. The amounts of aluminum are tabulated as percentages of the stoichiometric quantity needed to reduce the molybdenum to the trivalent state according to the reaction:

$$Mo^{+6} + Al^0 \rightarrow Mo^{+3} + Al^{+3}$$

In actual practice some of the aluminum was utilized in reacting with HCl and was therefore not available to reduce the molybdenum.

Table IV

| Stoich. Equiv. of Al, percent | HCl Conc., M | Mo in Org., gm./l. | Mo in Aq., gm./l. | K O/A |
|---|---|---|---|---|
| 200 | 6 | 0.18 | 1.32 | 0.14 |
| 200 | 8 | 0.12 | 1.38 | 0.09 |
| 200 | 10 | 0.14 | 1.36 | 0.10 |
| 59 | 8 | 2.56 | 0.36 | 7.1 |
| 118 | 8 | 2.20 | 0.82 | 2.7 |
| 177 | 8 | 0.71 | 2.24 | 0.32 |
| 236 | 8 | 0.34 | 2.60 | 0.13 |
| 0 | 10 | 1.85 | None found | |
| 64 | 10 | 1.78 | 0.07 | 25.4 |
| 128 | 10 | 1.20 | 0.65 | 1.8 |

The above data indicate that as the amount of reducing agent increased, the extraction of molybdenum decreased. The extraction of reduced (+3) molybdenum into TBP extractant is therefore very low and thus by reduction of the uranium solution the separation of uranium from the impurity molybdenum is effected.

EXAMPLE VI

The efficiency with which uranous ion is extracted from hydrochloric acid solutions of varying acidity was determined for the TBP in toluene extractant system. The distribution of +4 uranium between hydrochloric acid solution and 20% TBP in toluene is shown in the following Table V:

Table V

| HCl Conc., M | Initial Conc., $U_3O_8$ Aq., gm./l. | Phase Ratios, Aq./Org. | $U_3O_8$ in Org., gm./l. | $U_3O_8$ in Aq., gm./l. | K O/A |
|---|---|---|---|---|---|
| 3 | 320 | 0.26 | | 320 | Very low |
| 6 | 35 | 1.0 | 28.6 | 6.4 | 4.5 |
| 7 | 11.9 | 1.0 | 11.7 | 0.23 | 50 |
| 7.6 | 87 | 0.5 | 43 | 0.37 | 116 |
| 9 | 35 | 1.0 | 34.8 | 0.15 | 230 |
| 9 | 42.8 | 1.0 | 42.6 | 0.18 | 240 |
| 9 | 80 | 0.5 | 39.9 | 0.14 | 290 |
| 9 | 15.3 | 1.0 | 15.3 | 0.029 | 530 |
| 10 | 10 | 1.0 | 10.0 | 0.013 | 770 |
| 10 | 17 | 1.0 | 17.0 | 0.018 | 950 |

The effect of acid concentration is obvious from the data above, i.e., the extraction increased with an increase in acid concentration, said extraction efficiency becoming remarkably high at HCl concentrations of 9 M and above.

EXAMPLE VII

The recovery of uranous ions from laden organic extractants was investigated. Uranium tetrafluoride was precipitated from said extractant by the addition of 48% hydrofluoric acid. Various stoichiometric percentages of hydrofluoric acid were added to determine the thoroughness of $UF_4$ precipitation. The results of said investigations are tabulated in Table VI infra.

Table VI

| Solution, vol. ml. | $U_3O_8$ Conc., gm./l. | 48% HF added, gm. | Stoich. Equiv. F, percent | Final $U_3O_8$ Conc., gm./l. | Percent $UF_4$ Recovery |
|---|---|---|---|---|---|
| 25 | 34.8 | 0.442 | 85 | 9.31 | 73.2 |
| 25 | 34.9 | 0.530 | 102 | 0.96 | 97.2 |
| 50 | 43.0 | 1.324 | 104 | 1.13 | 97.4 |
| 25 | 42.6 | 0.707 | 111 | 0.39 | 99.1 |
| 50 | 43.0 | 1.565 | 123 | 0.12 | 99.7 |
| 25 | 28.6 | 0.609 | 143 | 2.37 | 91.7 |
| 25 | 42.6 | 1.073 | 170 | 0.13 | 99.7 |

As the data tabulated above indicate, hydrofluoric acid 10% in excess of the stoichiometric quantity is sufficient to precipitate 99% of the uranium from solution as $UF_4$ and that even greater excesses result in the recovery of at least 99.7% of the uranium.

EXAMPLE VIII

Electrolytic reduction of the uranium present in several types of process solutions was investigated. A strip solution of 8 M HCl, and eluates from ion exchange and resin-in-pulp plants were secured and had the following partial analyses:

| | HCl Pilot Plant Strip Sol., U.S.B.M. | Ion Exchange Plant, Kerr-McGee | KIP Eluate Monticello |
|---|---|---|---|
| gm. $U_3O_8$/l. | 47.5 | 13.13 | 6.70 |
| gm. Fe/l. | 3.28 | 1.17 | 0.12 |
| gm. Mo/l. | 1.11 | 0.016 | 0.007 |
| Equiv. H+/l. | 8.43 | 0.20 | 0.16 |

Figure 5:
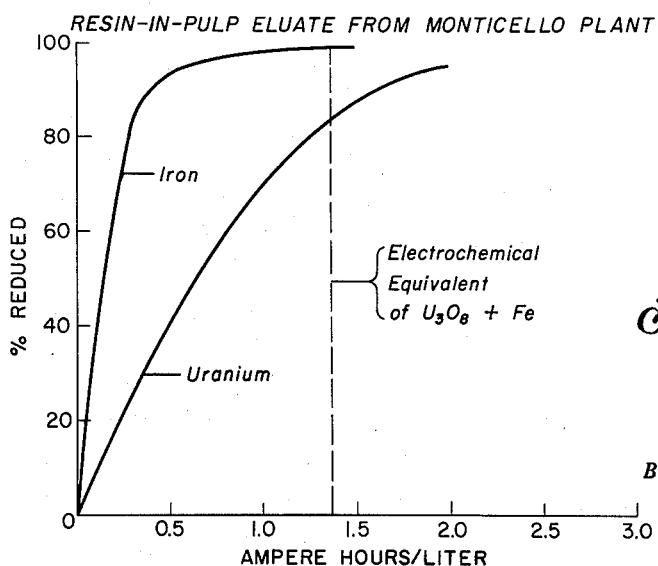
FIGURE 5 is a graphical representation of the electrolytic reduction of the ions in a resin-in-pulp eluate.
Figure 3:
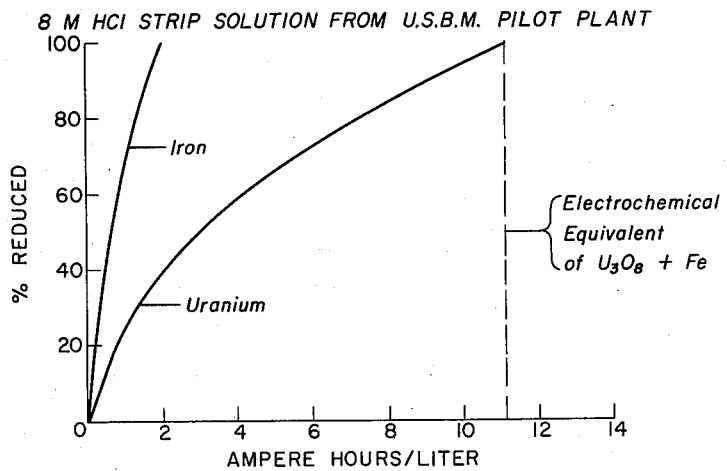
FIGURE 3 is a graphical representation of the electrolytic reduction of the ions in a strong acid strip solution.
Figure 4:
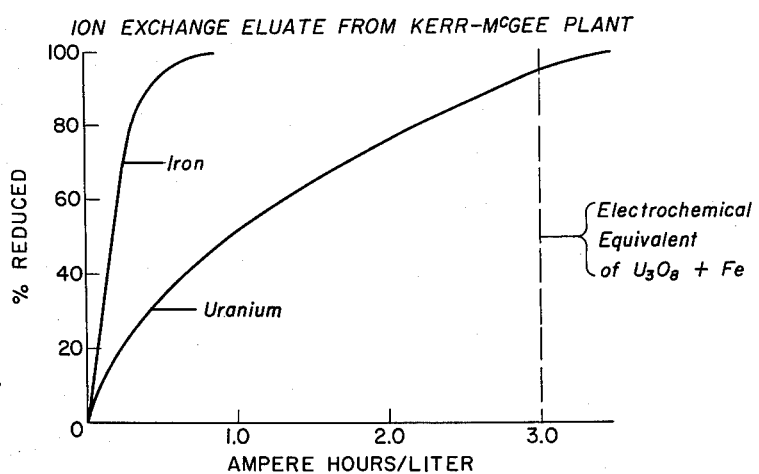
FIGURE 4 is a graphical representation of the electrolytic reduction of the ions in an ion exchange eluate.

The reduction was accomplished in a carbate cup serving as the cathode and having a total area of approximately 400 cm.$^2$. A 5/8" diameter graphite rod served as the anode and was compartmented from the cathode with a 1" diameter alundum cup. 600 mls. of the experimental solution was contained in the cathode compartment and 15 mls. in the anode compartment. Samples of the catholyte were taken at various times during the reduction and analyzed for ferrous and ferric iron. Uranium reduction was determined by the precipitation of uranium as $UF_4$ with HF and analysis of the filtrate for unreduced uranium. FIGURES 3, 4 and 5 of the drawing graphically illustrate the reduction of iron and uranium in the 8 M HCl strip solution, the ion exchange eluate, and the RIP eluate respectively as a function of the amount of current passed.

Examination of said figures shows that in each case reduction of the iron took place before the uranium reduction. The uranium was almost completely reduced by the time the theoretical electrochemical equivalent of $U_3O_8$ and Fe had been applied to the 8 M HCl strip solution. The reduction efficiency was not quite so high for the ion exchange and RIP eluate solutions wherein about 90% of the uranium in the ion exchange eluate and 80% of the uranium in the RIP eluate was reduced by the theoretical electrochemical equivalent. The E.M.F. tested in the above cases ranged from 1.5 to 3.0 volts, such variation gave negligible effects. However, above about 3.0 volts hydrogen evolution was evident and thus the uranium reduction efficiency would drop. The power requirement indicated for uranium reduction in the solutions supra at 3 volts was 0.3 kwh./lb. $U_3O_8$ for the 8 M HCl strip solution and about 0.5 kwh./lb. $U_3O_8$ for the ion exchange and RIP eluates. Electrolytic reduction has the obvious advantage of not introducing other contaminants.

What is claimed is:

In a process for preparing highly pure uranous tetrafluoride from impure uranium laden solvent extraction process strip solutions and ion exchange process and resin-in-pulp process eluate solutions which are at least 8 M in hydrochloric acid, the steps comprising treating said solution with a reducing agent thereby reducing the uranium in said solution to the +4 oxidation state, contacting the solution with an extractant phase comprising about 10 to 70% of tributyl phosphate in an organic solvent-diluent selected from the group consisting of benzene, ethyl-benzene, chlorobenzene, toluene, xylene, kerosene, and carbon tetrachloride to extract the uranium therein, treating the extract phase with an aqueous fluoride solution to precipitate uranous tetrafluoride therefrom, and separating the uranous tetrafluoride from the phases.

References Cited in the file of this patent

UNITED STATES PATENTS 2,769,686   McCullough et al. _____ Nov. 6, 1956

(Other references on following page)

OTHER REFERENCES

AEC Document K-706, February 27, 1951, pp. 18, 24 and 25.

AEC Document DOW-147, September 1, 1956, pp. 8-11.

AEC Document TID-7508, April 1, 1955, pp. 6-13.
AEC Document DOW-131, July 29, 1955, pp. 57-68.
AEC Document ORNL-912, May 21, 1951, p. 14.
AEC Document K-706, February 27, 1951, pp. 8, 9 and 17.